United States Patent
Yang et al.

(10) Patent No.: US 11,042,742 B1
(45) Date of Patent: Jun. 22, 2021

(54) APPARATUS AND METHOD FOR DETECTING ROAD BASED ON CONVOLUTIONAL NEURAL NETWORK

(71) Applicant: AJOU UNIVERSITY INDUSTRY-ACADEMIC COOPERATION FOUNDATION, Suwon-si (KR)

(72) Inventors: Hoeseok Yang, Suwon-si (KR); Heeji Im, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 17/191,102

(22) Filed: Mar. 3, 2021

(30) Foreign Application Priority Data

Mar. 11, 2020 (KR) .......................... 10-2020-0029944

(51) Int. Cl.
*G06K 9/00* (2006.01)
*G06K 9/62* (2006.01)
*G06T 7/11* (2017.01)
*G06N 3/08* (2006.01)
*G06N 3/04* (2006.01)

(52) U.S. Cl.
CPC ....... *G06K 9/00651* (2013.01); *G06K 9/6256* (2013.01); *G06N 3/04* (2013.01); *G06N 3/08* (2013.01); *G06T 7/11* (2017.01); *G06T 2207/10032* (2013.01); *G06T 2207/20081* (2013.01); *G06T 2207/20084* (2013.01); *G06T 2207/30184* (2013.01)

(58) Field of Classification Search
CPC .... G06K 9/00651; G06K 9/6256; G06N 3/04; G06N 3/08; G06T 7/11; G06T 2207/30184; G06T 2207/20084; G06T 2207/20081; G06T 2207/10032
See application file for complete search history.

(56) References Cited

U.S. PATENT DOCUMENTS

| | | | |
|---|---|---|---|
| 10,229,346 B1 | 3/2019 | Kim et al. | |
| 2020/0364554 A1* | 11/2020 | Wang | G06N 3/0454 |
| 2021/0125338 A1* | 4/2021 | Zhang | G06N 3/084 |

OTHER PUBLICATIONS

Jiang Xin, et al., "Road Extraction of High-Resolution Remote Sensing Images Derived from DenseUNet", Remote Sens. 2019, 11, 2499; doi:10.3390/rs11212499; www.mdpi.com/journal/remotesensing, pp. 1-18.
Korean Office Action for KR 10-2020-0029944 dated Aug. 1, 2020.

* cited by examiner

*Primary Examiner* — Ping Y Hsieh
(74) *Attorney, Agent, or Firm* — Sughrue Mion, PLLC

(57) ABSTRACT

Disclosed are convolutional neural network-based road detecting apparatus and method and a convolutional neural network-based road detecting method according to an exemplary embodiment of the present disclosure includes applying a dilation operation to a ground truth for a road image of a learning image, training an inference model which detects a road region from a satellite image based on the learning image and the ground truth to which the dilation operation is applied, and receiving a prediction target image and generating an original segmentation map in which a road region is detected from the prediction target image by means of the inference model.

12 Claims, 11 Drawing Sheets

[FIG. 1]
 
(a)            (b)

[FIG. 2]
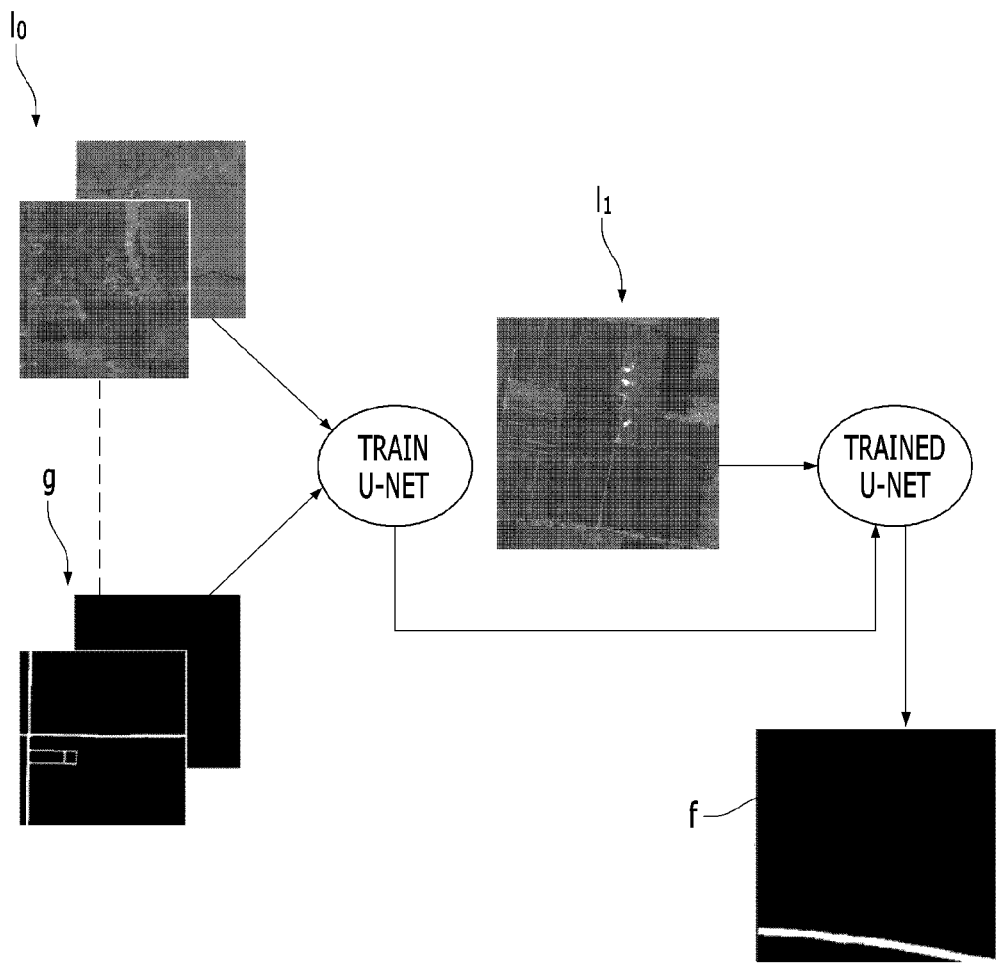

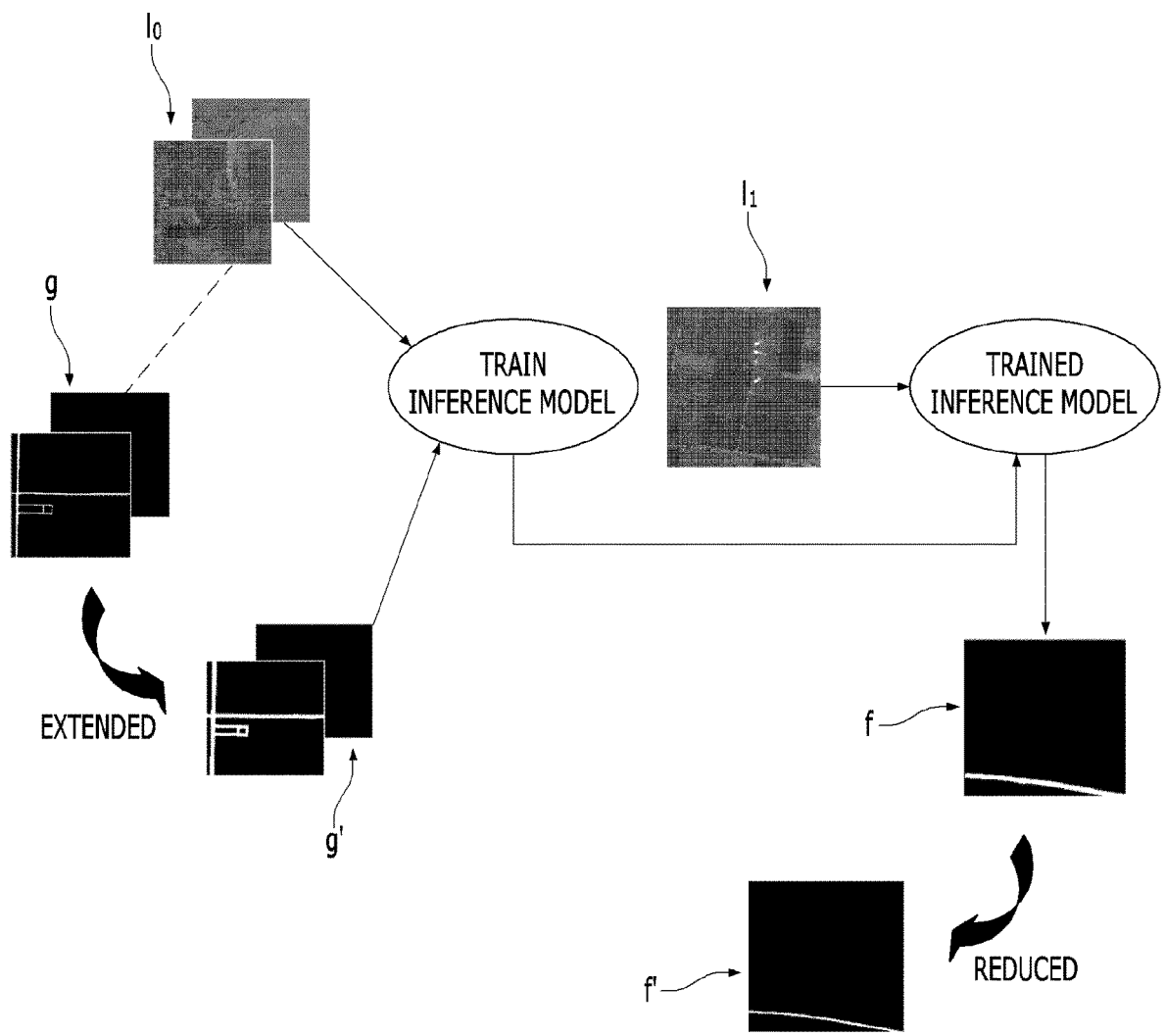
[FIG. 3]

[FIG. 4]
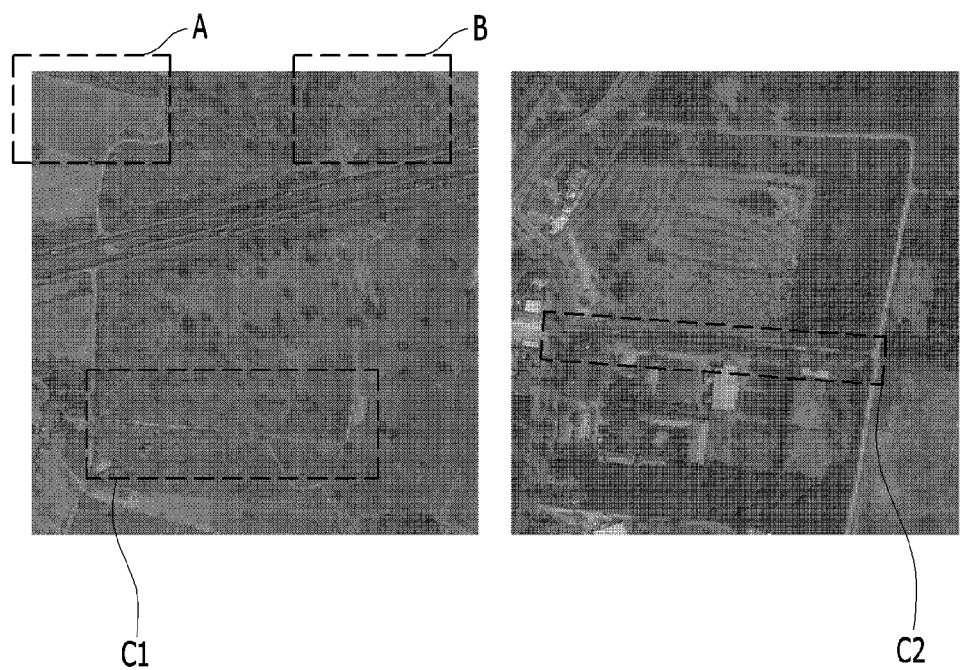

[FIG. 5]
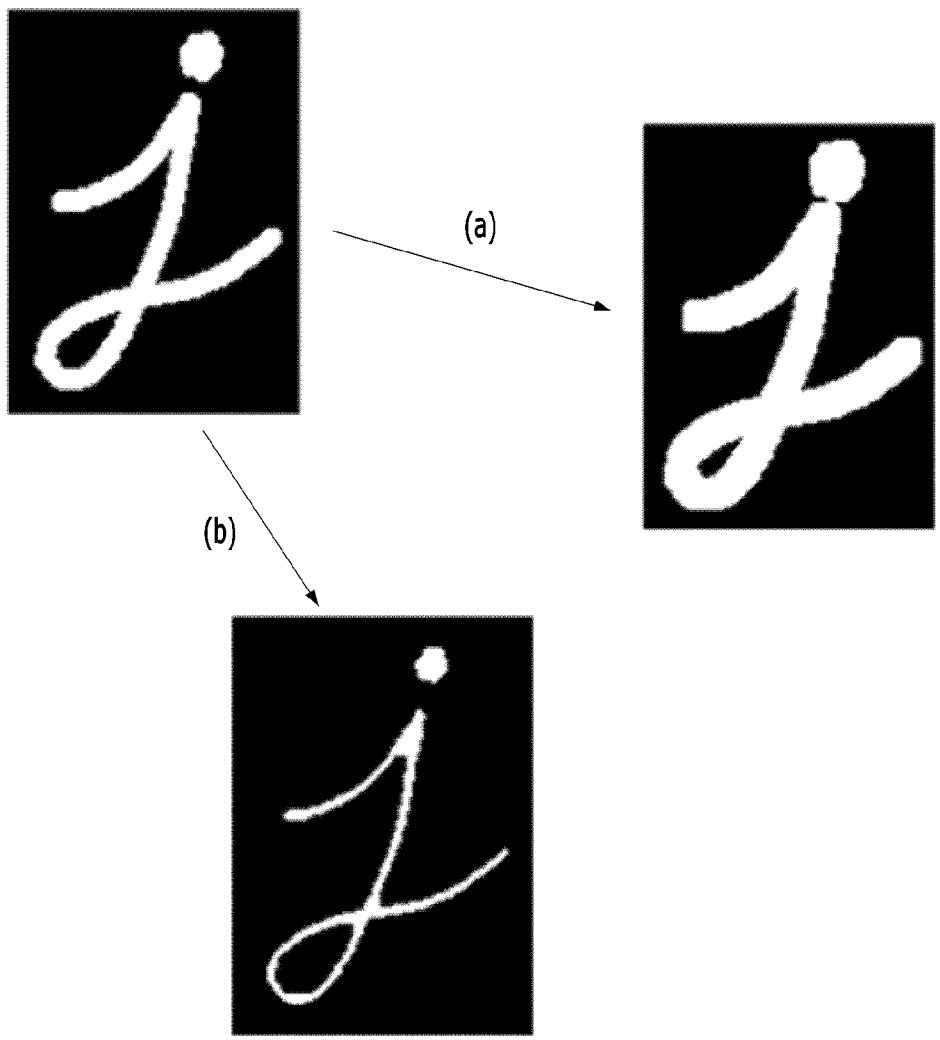

[FIG. 6A]
(a)
(b)
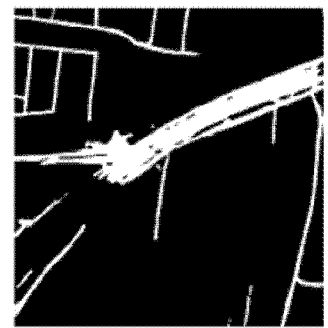
(c)
(d)
n=3
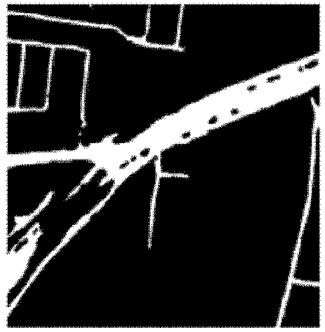
(e)
n=5
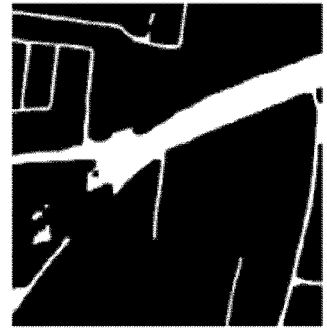
(f)
n=11

[FIG. 6B]
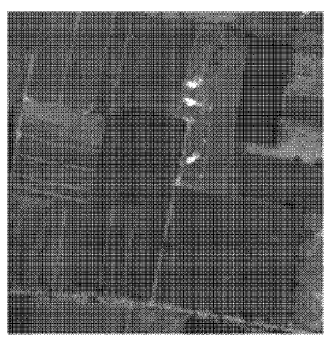
(a)
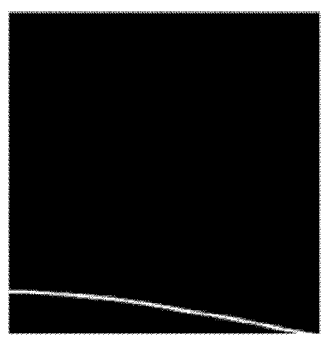
(b)
(c)
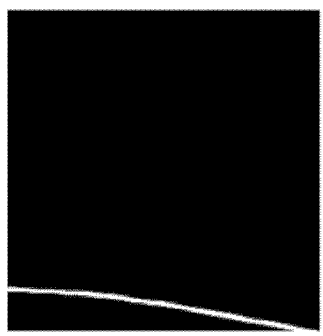
(d)
n=3
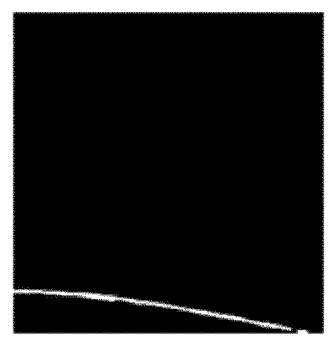
(e)
n=5
(f)
n=11

[FIG. 6C]
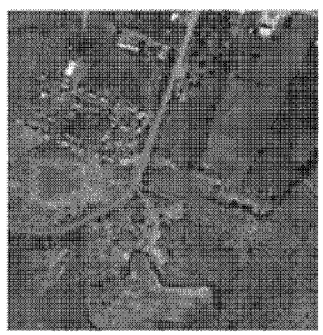
(a)
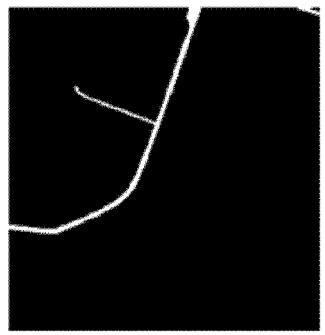
(b)
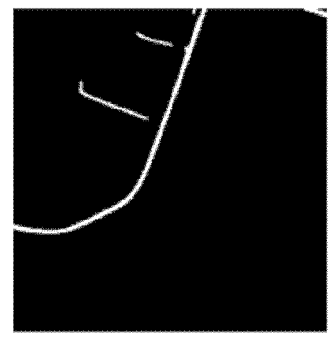
(c)
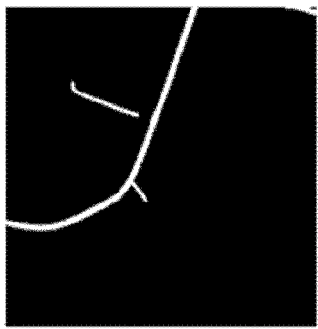
(d)
n=3
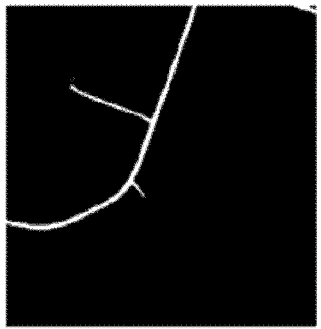
(e)
n=5
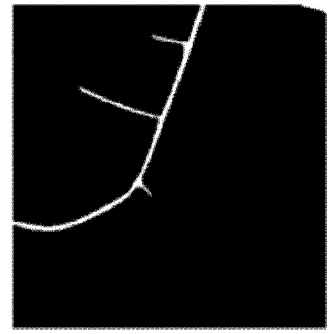
(f)
n=11

[FIG. 6D]

|  | Unet | $n=3$ | $n=5$ | $n=11$ |
|---|---|---|---|---|
| batch /epochs | 4/160 | 4/250 | 4/250 | 4/260 |
| relaxed precision | 0.7419 | 0.7214 | 0.7360 | 0.7005 |
| relaxed recall | 0.6812 | 0.7081 | 0.6944 | 0.6853 |
| IoU | 0.6438 | 0.6465 | 0.6476 | 0.6047 |

[FIG. 7]
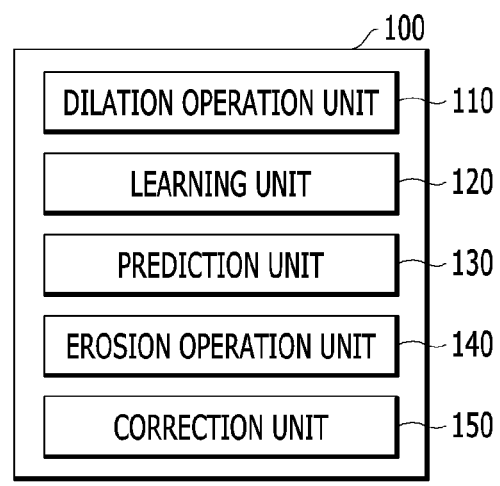

[FIG. 8]
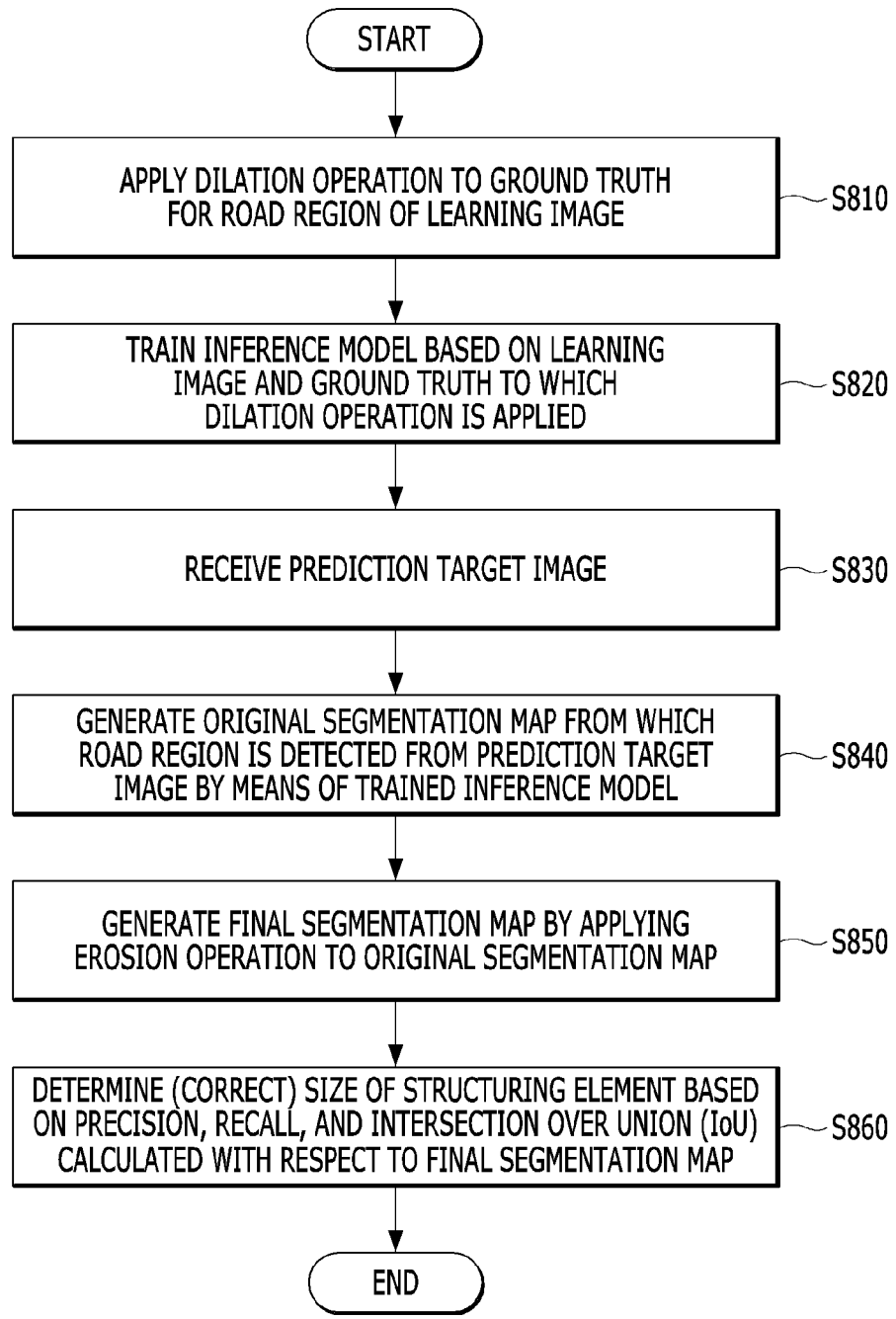

APPARATUS AND METHOD FOR DETECTING ROAD BASED ON CONVOLUTIONAL NEURAL NETWORK

CROSS-REFERENCE TO RELATED APPLICATIONS

This application claims the priority of Korean Patent Application No. 10-2020-0029944 filed on Mar. 11, 2020, in the Korean Intellectual Property Office, the disclosure of which is incorporated herein by reference.

BACKGROUND

Field

The present disclosure relates to an apparatus and a method for detecting a road based on a convolutional neural network, and more particularly, to an apparatus and a method for detecting a road based on a convolutional neural network utilizing morphological image processing.

Description of the Related Art

A job of detecting roads from a satellite image is utilized in various applications such as navigation or disaster management systems so that many related studies are being conducted.

FIG. 1 is a conceptual view for explaining a semantic segmentation technique for detecting a road region from a satellite image. Referring to FIG. 1, the semantic segmentation technique is utilized to search a given satellite image (a) in pixel units to output a result (b) of labeling a region corresponding to a road.

Since fully convolutional networks (FCN) which extract a segmentation map through a single forward pass have been proposed first as a study applying a convolutional neural network with regard to the semantic segmentation technique, U-Net proposed based on the FCN employs a structure of encoder-decoder and maintains position information of the image by utilizing a combined layer to improve a semantic segmentation performance for the image. Further, in the deep residual U-Net, a residual learning concept is combined with the existing U-Net to improve the precision of the road detection and in D-LinkNet, a dilated convolution is utilized to improve the precision of the road detection.

FIG. 2 is a conceptual view for explaining a road region detecting technique utilizing U-Net of the related art.

Referring to FIG. 2, according to the method utilizing a U-Net of the related art, in the learning step, the U-Net is trained with a satellite input image $I_0$ and a ground truth (g) therefor and in an inferring step using the trained U-Net, a test image $I_1$ is inferred to output a segmentation map (f). However, the segmentation map (f) for the test image ($I_1$) extracted using the above-mentioned method has a limitation in that it is disconnected to be output without preserving a connectivity of road feature points. Specifically, referring to FIG. 2, it is visually confirmed that there is a disconnection in the road feature points extracted from the segmentation map (f) which is a result of detecting a road region from a satellite image by utilizing the U-Net of the related art. As described above, it is understood that when the road region is detected from the satellite image, it is very difficult to draw a precise prediction result while preserving a connectivity of the road feature points.

Further, according to the satellite image road detecting method using a U-Net of the related art, even though the value of intersection over union (IoU) which is a quantitative indicator may be high, as described above, the limitation was clear in terms of preserving a connectivity of the road feature points when the output image (segmentation map, f) was visually viewed.

A related art of the present disclosure is disclosed in Korean Registered Patent Publication No. 10-1875781.

SUMMARY

The present disclosure has been made an effort to solve the above-described problems of the related art and an object thereof is to provide an apparatus and a method for detecting a road based on a convolutional neural network which improve a disconnection phenomenon of road feature points caused by a road region which is unclearly shown from a satellite image and allow the road region detected from the satellite image to well preserve the connectivity of the feature points.

However, objects to be achieved by various embodiments of the present disclosure are not limited to the technical objects as described above and other technical objects may be present.

As a technical means to achieve the above-described technical object, according to an aspect of the present disclosure, a convolutional neural network-based road detecting method includes applying a dilation operation to a ground truth for a road image of a learning image, training an inference model which detects a road region from a satellite image based on the learning image and the ground truth to which the dilation operation is applied, and receiving a prediction target image and generating an original segmentation map in which a road region is detected from the prediction target image by means of the inference model.

Further, the convolutional neural network-based road detecting method according to an exemplary embodiment of the present disclosure may further include generating a final segmentation map by applying an erosion operation to the original segmentation map.

Further, in the applying of a dilation operation, a predetermined structuring element-based convolution operation may be performed on the ground truth.

Further, in the generating of a final segmentation map, a predetermined structuring element-based convolution operation may be performed on the original segmentation map.

Further, the structuring element may have a square shape or a circular shape.

The ground truth may be a binarized image in which a pixel value of a region corresponding to a road in the learning image is 1 and a pixel value of a region other than the region corresponding to a road is 0.

Further, the final segmentation map may be a binarized image in which a pixel value of a region inferred to correspond to the road by the inference model in the prediction target image is 1 and a pixel value of a region other than the inferred region is 0.

Further, the convolutional neural network-based road detecting method according to an exemplary embodiment of the present disclosure may further include determining a size of the structuring element based on a precision, a recall, and an intersection over union (IoU) calculated based on the ground truth for the final segmentation map.

Further, the inference model may be a U-Net-based convolutional neural network.

In the meantime, according to another aspect of the present disclosure, a convolutional neural network-based road detecting apparatus may include a dilation operation unit which applies a dilation operation to a ground truth for a road region of a learning image, a learning unit which trains an inference model which detects a road region from a satellite image based on the learning image and the ground truth to which the dilation operation is applied, a prediction unit which receives a prediction target image and generates an original segmentation map in which a road region is detected from the prediction target image by means of the inference model, and an erosion operation unit which generates a final segmentation map by applying an erosion operation to the original segmentation map.

The dilation operation unit may perform a predetermined structuring element-based convolution operation on the ground truth.

The erosion operation unit may perform a predetermined structuring element-based convolution operation on the original segmentation map.

Further, the convolutional neural network-based road detecting apparatus according to an exemplary embodiment of the present disclosure may further include a correction unit which determines a size of the structuring element based on a precision, a recall, and an intersection over union (IoU) calculated based on the ground truth for the final segmentation map.

The above-described solving means are merely illustrative but should not be construed as limiting the present disclosure. In addition to the above-described embodiments, additional embodiments may be further provided in the drawings and the detailed description of the present disclosure.

According to the solving means of the present disclosure, it is possible to provide an apparatus and a method for detecting a road based on a convolutional neural network which improve a disconnection phenomenon of road feature points caused by a road region which is unclearly shown from a satellite image and well preserve the connectivity of the feature points of the road region detected from the satellite image.

According to the solving means of the present disclosure, the number of false negatives (FN) is reduced as compared with the U-Net-based inference model of the related art so that the feature point may be extracted from the satellite image with a high precision and the recall may be improved.

However, the effect which can be achieved by the present disclosure is not limited to the above-described effects, there may be other effects.

BRIEF DESCRIPTION OF DRAWINGS

The above and other aspects, features and other advantages of the present disclosure will be more clearly understood from the following detailed description taken in conjunction with the accompanying drawings, in which:

FIG. 1 is a conceptual view for explaining a semantic segmentation technique for detecting a road region from a satellite image;

FIG. 2 is a conceptual view for explaining a road region detecting technique utilizing U-Net of the related art;

FIG. 3 is a conceptual view for explaining a road detecting technique based on a convolutional neural network using morphological image processing according to an exemplary embodiment of the present disclosure;

FIG. 4 is a view for explaining a characteristic of a satellite image including a road region;

FIG. 5 is a conceptual view for explaining a dilation operation and an erosion operation according to an exemplary embodiment of the present disclosure;

FIGS. 6A to 6C are views illustrating comparison of the final segmentation map derived by a convolutional neural network-based road detecting apparatus according to an exemplary embodiment of the present disclosure and a U-Net of the related art and a change of a final segmentation map in accordance with adjustment of a size of a structuring element;

FIG. 6D is a table illustrating a performance evaluation result based on a predetermined evaluation indicator for a convolutional neural network-based road detecting apparatus according to an exemplary embodiment of the present disclosure;

FIG. 7 is a schematic diagram of a convolutional neural network-based road detecting apparatus according to an exemplary embodiment of the present disclosure; and FIG. 8 is an operation flowchart of a convolutional neural network-based road detecting method according to an exemplary embodiment of the present disclosure.

DETAILED DESCRIPTION OF THE EMBODIMENT

Hereinafter, the present disclosure will be described more fully hereinafter with reference to the accompanying drawings, in which exemplary embodiments of the present disclosure are shown, so that those of ordinary skill in the art may easily implement the present disclosure. However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification and the claims that follow, when it is described that an element is "coupled" to another element, the element may be "directly coupled" to the other element or "electrically coupled" or "indirectly coupled" to the other element through a third element.

Through the specification of the present disclosure, when one member is located "on", "above", "on an upper portion", "below", "under", and "on a lower portion" of the other member, the member may be adjacent to the other member or a third member may be disposed between the above two members.

In the specification of the present disclosure, unless explicitly described to the contrary, the word "comprise" and variations such as "comprises" or "comprising", will be understood to imply the inclusion of stated elements but not the exclusion of any other elements.

The present disclosure relates to an apparatus and a method for detecting a road based on a convolutional neural network, and more particularly, to an apparatus and a method for detecting a load based on a convolutional neural network utilizing morphological image processing.

FIG. 3 is a conceptual view for explaining a road detecting technique based on a convolutional neural network using morphological image processing according to an exemplary embodiment of the present disclosure.

Referring to FIG. 3, a convolutional neural network-based road detecting apparatus 100 according to an exemplary embodiment of the present disclosure (hereinafter, simply referred to as a "road detecting apparatus 100") may train an inference model using a ground truth g' obtained by applying a dilation operation for extending road feature points by morphological image processing to a ground truth (g) for a learning image $I_0$ in a learning step. Further, in a subsequent inference step, the road detecting apparatus 100 may infer the prediction target image $I_1$ with a model trained in consideration of morphological transformation to extract an original segmentation map f and generate a final segmentation map f' by applying an erosion operation to the original segmentation map to restore the original segmentation map f which is output in an extended state due to a ground-truth learning which morphologically extends the road feature point into its original scale.

Hereinafter, after describing a feature of the satellite image, schematically described matters for an operation and a function of precisely extracting a road region from a satellite image in consideration of the feature of the satellite image by a road detecting apparatus 100 will be described in more detail with reference to FIG. 4.

FIG. 4 is a view for explaining a characteristic of a satellite image including a road region.

Referring to FIG. 4, a satellite image is obtained by capturing a road at a high altitude so that the road may not be clearly displayed due to a surrounding pixel having a similar color to the road, objects such as trees or buildings, or shadows of the objects in some cases. Specifically, referring to FIG. 4, in the satellite image obtained by capturing the road, there may be an area A having a similar characteristic to the road, an area B in which pixels having similar colors to the road are adjacent to the road, and areas C1 and C2 in which the road region is partially blocked by structures such as trees or buildings or shadows of the structures.

With regard to this, the inventors of the present disclosure aim to improve a road detection precision level by training the inference model to recognize a wider area as a road using a ground truth in which a road feature point is extended during the process of training the inference model which detects a road region from the satellite image.

Specifically, the road detecting apparatus 100 may apply an extension operation to the ground truth g for the road region of the received learning image $I_0$. Here, the extension operation may refer to a dilation operation which changes the ground truth road region to be thick. Further, a plurality of learning images $I_0$ may be utilized during the learning step.

In the description of the exemplary embodiment of the present disclosure, the ground truth g may be understood as correct answer information (label information) about a road region included in the learning image $I_0$. The inference model to be described below may operate to output a segmentation map corresponding to the ground truth g utilized for the learning with respect to a prediction target image $I_1$ for which a ground truth g is not ensured by learning a correlation between the learning image $I_0$ utilized as learning data and a ground truth g of the corresponding learning image $I_0$.

Further, in the description of the exemplary embodiment of the present disclosure, the ground truth may refer to a binarized image in which a pixel value of a region corresponding to the road is 1 and a pixel value of a region other than the road is 0 in the satellite image (learning image and the like).

According to the exemplary embodiment of the present disclosure, the road detecting apparatus 100 may apply a dilation operation which performs a predetermined structuring element-based convolution operation on the ground truth. Specifically, the dilation operation which is applied by the road detecting apparatus 100 may substitute a pixel value in a region overlapping with a maximum value, among pixel values of a region overlapping the structuring element while scanning the ground truth g with reference to a center portion of the predetermined structuring element. As for reference, the above-described dilation operation may also be referred to as "label dilation".

Further, according to an exemplary embodiment of the present disclosure, the structuring element may have a square shape or a circular shape. Specifically, a square structuring element may have a size including n×n pixels. Further, a circular structuring element may have a radius R. As for reference, the structuring element (SE) may also be referred to as a filter, a kernel, or a window depending on an implementation example of the present disclosure.

According to an exemplary embodiment of the present disclosure, the square structuring element may have an n value which is an odd number, but is not limited thereto. Further, in the case of the square structuring element including n×n pixels (n is an odd number), when pixels included in the structuring element are represented by (1,1) to (n,n), the center portion of the structuring element may refer to a ((n+1)/2, (n+1)/2) pixel. As another example, the center portion of the circular structuring element may refer to a pixel corresponding to a center of the circle.

Further, the road detecting apparatus 100 may train the inference model which detects the road region from the satellite image based on the learning image $I_0$ and the ground truth g' to which the dilation operation is applied. According to an exemplary embodiment of the present disclosure, the inference model may be a U-Net-based convolutional neural network. The U-Net-based convolutional neural network has an advantage in that a structure (layer) is comparatively simple and it can be applied to semantic segmentation in various fields. However, the type of the inference model to which the present disclosure is applied is not limited to the U-Net, but various artificial intelligence-based inference models which have been known in the related art or will be developed in the future may be applied.

Further, the road detecting apparatus 100 may receive a prediction target image $I_1$. Further, the road detecting apparatus 100 may generate an original segmentation map f from which the road region is detected, from the prediction target image $I_1$, by means of the trained inference model. Here, since the original segmentation map f is learned based on the ground truth g' to which the dilation operation morphologically extending the road feature point is applied, the original segmentation map may be output to be extended. Accordingly, the road detecting apparatus 100 may generate a final segmentation map f' whose scale is corrected, by applying a reduction operation to the generated original segmentation map f.

Here, the reduction operation may refer to an erosion operation which changes the road region in the original segmentation f which is primarily extracted to be thin.

Further, in the description of the exemplary embodiment of the present disclosure, the original segmentation map f and the final segmentation map f' may refer to binarized images in which a pixel value of a region inferred to correspond to the road by the inference model trained from the prediction target image $I_1$ is 1 and a pixel value of a region other than the region inferred to correspond to the road is 0.

According to an exemplary embodiment of the present disclosure, the road detecting apparatus 100 may perform a convolution operation based on a predetermined structuring element (SE) on the original segmentation map f which is primarily generated to perform an erosion operation.

According to an exemplary embodiment of the present disclosure, the structuring element utilized for the erosion operation may be the same as a structuring element utilized to extend the ground truth g of the learning image $I_0$ in the learning step of the corresponding inference model (including a structuring element within an error range which can be substantially recognized to be the same), but is not limited thereto. As another example, when it is required to output a final segmentation map f' in which the road region is extended according to an implementation example of the present disclosure, the structuring element applied in the dilation operation and the structuring element applied in the erosion operation may be different from each other if necessary.

According to an exemplary embodiment of the present disclosure, the road detecting apparatus 100 may generate a final segmentation map f' by performing the erosion operation which substitutes a pixel value in an overlapping region with a minimum value, among pixel values of a region overlapping the structuring element while scanning the original segmentation map f with reference to a center portion of a predetermined structuring element. As for reference, the above-described erosion operation may also be referred to as "label reduction".

FIG. 5 is a conceptual view for explaining a dilation operation and an erosion operation according to an exemplary embodiment of the present disclosure.

Referring to FIG. 5, in summary of the above-described dilation operation process, it is confirmed that the road detecting apparatus 100 changes the pixel value (input image extension) of the given ground truth g by applying a dilation technique which performs a convolution operation with a predetermined structuring element on the ground truth g of the learning image $I_0$ and when such a dilation operation is performed, the feature point becomes thick as illustrated in (a) of FIG. 5. In other words, the feature point of the road region which is reflected to the ground truth g of the learning image $I_0$ by applying the dilation operation by the road detecting apparatus 100 may be extended.

Further, referring to FIG. 5, in summary of the above-described erosion operation process, it is confirmed that the road detecting apparatus 100 changes a pixel value of a given original segmentation map f (input image reduction) by applying an erosion technique which performs a convolution operation with a predetermined structuring element on the primarily generated original segmentation map f and when such an erosion operation is performed, the feature point is reduced (to be thin) as illustrated in (b) of FIG. 5. In other words, the feature point for the road region reflected to the original segmentation map f by applying the erosion operation by the road detecting apparatus 100 is extended to generate the final segmentation map f'.

Hereinafter, referring to FIGS. 6A to 6D, an evaluation result for a road detection performance of the final segmentation map f' which is output by the road detecting apparatus 100 of the present disclosure is compared with a U-Net-based road detecting technique of the related art and changes of the road detection performance according to the size change of the structuring element are visually compared (see FIGS. 6A to 6C) and are compared by a quantitative indicator (see FIG. 6D).

FIGS. 6A to 6C are views illustrating comparison of the final segmentation map derived by a convolutional neural network-based road detecting apparatus according to an exemplary embodiment of the present disclosure and a U-Net of the related art and a change of a final segmentation map in accordance with adjustment of a size of a structuring element.

Specifically, FIGS. 6A to 6C are associated with satellite images captured from first to third regions which are different locations. In FIGS. 6A to 6C, (a) is a prediction target image which is input to the inference model, (b) is a ground truth for a prediction target image of (a), (c) to (f) are segmentation maps which are results of inferring a road region from the prediction target image by the trained inference model in which (c) is a result of applying an inference model for a U-Net technique of the related art and (d) to (f) illustrate final segmentation maps f' output by the road detecting apparatus 100 proposed by the present disclosure.

Specifically, in (d) to (f) of FIGS. 6A to 6C, a square structuring element of n×n is utilized as a structuring element SE for the dilation operation and the erosion operation and as illustrated in a lower portion of each drawing, in (d), n is 3, in (e), n is 5, and in (f), n is 11. In other words, n is associated with the size of the square structuring element and may represent a parameter indicating an extension or reduction degree.

When (c) and (d) of FIGS. 6A and 6B are compared, in prediction target images for a first region (FIG. 6A) and a second region (FIG. 6B), it can be visually confirmed that the connectivity of the road feature point is well preserved by the present disclosure rather than by the U-Net technique of the related art.

Further, when (c) and (d) of FIG. 6C are compared, in a prediction target image for a third region (FIG. 6C), a region which is not an actual road is detected from an upper center portion as a road by the U-Net technique of the related art, but the erroneously predicted region is not generated by the present disclosure so that it can be visually confirmed that the erroneous prediction of the road region is prevented by the present disclosure.

Further, referring to (e) and (f) of FIGS. 6A to 6C, it is confirmed that the connectivity of the road feature points for the prediction target image of the second region (FIG. 6B) and the third region (FIG. 6C) is preserved by the present disclosure better than by the U-Net of the related art.

FIG. 6D is a table illustrating a performance evaluation result based on a predetermined evaluation indicator for a convolutional neural network-based road detecting apparatus according to an exemplary embodiment of the present disclosure.

FIG. 6D illustrates a table of a result of one experiment example associated with the convolutional neural network-based road detecting apparatus according to an exemplary embodiment of the present disclosure. For example, this experiment was conducted by utilizing road image learning data provided by DeepGlobe Road Extraction Challenge 2018. In this experiment, after performing the learning with 6126 images among the given road image learning data, as learning images $I_0$, the quantitative evaluation was performed based on a final segmentation map f' output with 100 images which were randomly extracted from the road image learning data as prediction target images $I_1$.

Further, in this experiment, the U-Net-based learning of the related art and the learning by the road detecting apparatus 100 to which the dilation and erosion techniques proposed by the present disclosure were applied were performed until the intersection of union (IoU) value is converged, which are represented in batch/epochs rows in FIG. 6D.

As for reference, as a quantitative indicator for evaluating a semantic segmentation result, generally, intersection of union (IoU), a precision, and a recall may be used. With regard to this, a concept of confusion matrix will be described first. A confusion matrix is a matrix or a table which may visualize a performance of a classification algorithm and may be represented as shown in the following Table 1.

TABLE 1

|  | P' (predicted) | N' (predicted) |
| --- | --- | --- |
| P (actual) | TP (True Positive) | FN (False Negative) |
| N (actual) | FP (False Positive) | TN (True Negative) |

Referring to Table 1, "TP" is the number of pixels in which pixels corresponding to an actual road are precisely predicted as a road, "TN" is the number of pixels in which pixels which do not correspond to an actual road are precisely predicted that it is not a road, "FN" is the number of pixels in which pixels corresponding to an actual road are erroneously predicted that it is not a road, and "FP" is the number of pixels in which pixels which do not correspond to the actual road are erroneously predicted as a road.

With regard to this, the intersection of union (IoU), the precision, the recall may be calculated by the following Equations 1 to 3.

$$IoU = \frac{TP}{TP + FN + FP} \quad \text{[Equation 1]}$$

$$\text{precision} = \frac{TP}{TP + FP} \quad \text{[Equation 2]}$$

$$\text{recall} = \frac{TP}{TP + FN} \quad \text{[Equation 3]}$$

However, it is difficult to determine a labeling (inference) precision for all pixels which are determined as a road region by the above-mention indicators, so that in the experiment illustrated in FIG. 6D, concepts of relaxed precision and relaxed recall which select a predetermined pixel to reflect the pixel to calculate the indicator were introduced.

Specifically, the relaxed precision may refer to a ratio of pixels labelled (inferred) as a road region in the predicted final segmentation map f' matching within a predetermined number p of pixels from road pixels of the actual ground truth with respect to the corresponding prediction target image. Further, the relaxed recall may refer to a ratio of the road pixel of the ground truth with respect to the corresponding prediction target image which is predicted within a predetermined number p of pixels of the road pixel in the predicted final segmentation map f'.

Referring to FIG. 6D based on the above description, according to the present disclosure, it is confirmed that the relaxed recall value is increased regardless of the number of n as compared with the U-Net-based learning method of the related art. That is, it is confirmed that as the relaxed recall value is increased, according to the present disclosure, the number of false negatives (FN) may be reduced as compared with the U-Net-based method of the related art so that the road feature point may be more precisely extracted and thus the connectivity of the road feature point may be well preserved.

However, for example, when n is 11 so that the value of n is too large (in other words, the size of the square structuring element is large), the number of false positives (FP) is increased so that the relaxed precision value is reduced. Therefore, it is confirmed that when the size of the structuring element is not appropriately set, a pixel which is not an actual road may be predicted (over-predicted) as a road.

With regard to this, according to an exemplary embodiment of the present disclosure, the road detecting apparatus 100 may determine (correct) a size of the structuring element based on a precision, a recall, and an intersection over union (IoU) value which are calculated based on the ground truth for the final segmentation map f'.

Here, when the road detecting apparatus 100 determines (corrects) the size of the structuring element, it means that the value of n is determined (optimized) based on the precision, the recall, and the intersection over union (IoU) value calculated with respect to the prediction result based on a predetermined number of satellite images as described in the experimental example. As another example, in the case of the circular structuring element, a value of radius R is determined (optimized) based on the precision, the recall, and the intersection over union (IoU) value calculated with respect to the prediction result based on a predetermined number of satellite images.

According to an exemplary embodiment of the present disclosure, the road detecting apparatus 100 may include a plurality of inference models which is trained by means of respective structuring elements having different sizes and select an optimized structuring element by selecting any one inference model among the plurality of inference models according to a characteristic (for example, a regional characteristic for a location where a prediction target image $I_1$ is captured, such as a building density or geographic information) of the received prediction target image $I_1$. As another example, the road detecting apparatus 100 may determine whether the road feature point for the derived final segmentation map f' is disconnected by utilizing an inference model which is trained by means of a structuring element having a predetermined size and when there is a disconnection, retrain the inference model to utilize a structuring model having a size different from the size of the corresponding structuring element or reselect another inference model.

FIG. 7 is a schematic diagram of a convolutional neural network-based road detecting apparatus according to an exemplary embodiment of the present disclosure.

Referring to FIG. 7, the road detecting apparatus 100 may include a dilation operation unit 110, a learning unit 120, a prediction unit 130, an erosion operation unit 140, and a correction unit 150.

The dilation operation unit 110 may apply a dilation operation to the ground truth g for the road region of the learning image $I_0$. According to an exemplary embodiment of the present disclosure, the dilation operation unit 110 may perform a predetermined structuring element-based convolution operation on the ground truth g.

The learning unit 120 may train the inference model which detects the road region from the satellite image based on the learning image $I_0$ and the ground truth g' to which the dilation operation is applied. Here, the inference model may be a U-Net-based convolutional neural network.

The prediction unit 130 may receive a prediction target image $I_1$.

The prediction unit 130 may generate an original segmentation map f from which the road region is detected, from the prediction target image $I_1$ received by means of the inference model generated (trained) by the learning unit 120.

The erosion operation unit 140 may generate a final segmentation map f' by applying an erosion operation to the primarily generated original segmentation map f. According to an exemplary embodiment of the present disclosure, the erosion operation unit 140 may perform a predetermined structuring element-based convolution operation on the generated original segmentation map f.

The correction unit 150 may determine a size of the structuring element which is utilized for the dilation operation or the erosion operation based on the precision, the recall, and the intersection over union (IoU) calculated based on the ground truth for the final segmentation map f'.

Hereinafter, an operation flow of the present disclosure will be described in brief based on the above detailed description.

FIG. 8 is an operation flowchart of a convolutional neural network-based road detecting method according to an exemplary embodiment of the present disclosure.

The convolutional neural network-based road detecting method illustrated in FIG. 8 may be performed by the road detecting apparatus 100 which has been described above. Therefore, even though some contents are omitted, the contents which have been described for the road detecting apparatus 100 may be applied to the description of the convolutional neural network-based road detecting method in the same manner.

Referring to FIG. 8, in step S810, the dilation operation unit 110 may apply a dilation operation to the ground truth g for the road region of the learning image $I_0$.

Further, in step S810, the dilation operation unit 110 may perform a predetermined structuring element-based convolution operation on the ground truth g.

Next, in step S820, the learning unit 120 may train the inference model which detects the road region from the satellite image based on the learning image $I_0$ and the ground truth g' to which the dilation operation is applied. Here, the inference model may be a U-Net-based convolutional neural network.

Next, in step S830, the prediction unit 130 may receive a prediction target image $I_1$.

Next, in step S840, the prediction unit 130 may generate an original segmentation map f from which the road region is detected, from the prediction target image $I_1$ received in step S830 by means of the inference model generated (trained) in step S820.

Next, in step S850, the erosion operation unit 140 may generate a final segmentation map f' by applying an erosion operation to the original segmentation map f generated in step S840.

Further, in step S850, the erosion operation unit 140 may perform a predetermined structuring element-based convolution operation on the generated original segmentation map f.

Next, in step S860, the correction unit 150 may determine a size of the structuring element which is utilized for the dilation operation or the erosion operation based on the precision, the recall, and the intersection over union (IoU) calculated based on the ground truth for the final segmentation map f'.

In the above-description, steps S810 to S860 may be further divided into additional steps or combined as smaller steps depending on an implementation example of the present disclosure. Further, some steps may be omitted if necessary and the order of steps may be changed.

The convolutional neural network-based road detecting method according to the exemplary embodiment of the present disclosure may be implemented as program instructions which may be executed by various computer means to be recorded in a computer readable medium. The computer readable medium may include solely a program instruction, a data file, and a data structure or a combination thereof. The program instruction recorded in the medium may be specifically designed or constructed for the present disclosure or known to those skilled in the art of a computer software to be used. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program instruction, such as a ROM, a RAM, and a flash memory. Examples of the program instruction include not only a machine language code which is created by a compiler but also a high level language code which may be executed by a computer using an interpreter. The hardware device may operate as one or more software modules in order to perform the operation of the present disclosure and vice versa.

Further, the above-described convolutional neural network-based road detecting method may also be implemented as a computer program or an application executed by a computer which is stored in a recording medium.

The above description of the present disclosure is illustrative only and it is understood by those skilled in the art that the present disclosure may be easily modified to another specific type without changing the technical spirit of an essential feature of the present disclosure. Thus, it is to be appreciated that the embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A convolutional neural network-based road detecting method, comprising:

applying a dilation operation to a ground truth for a road image of a learning image;

training an inference model which detects a road region from a satellite image based on the learning image and the ground truth to which the dilation operation is applied;

receiving a prediction target image and generating an original segmentation map in which a road region is detected from the prediction target image by means of the inference model; and generating a final segmentation map by applying an erosion operation to the original segmentation map.

2. The road detecting method according to claim 1, wherein in the applying of a dilation operation, a predetermined structuring element-based convolution operation is performed on the ground truth.

3. The road detecting method according to claim 2, wherein in the generating of a final segmentation map, a predetermined structuring element-based convolution operation is performed on the original segmentation map.

4. The road detecting method according to claim 3, wherein the structuring element has a square shape or a circular shape.

5. The road detecting method according to claim 3, wherein the ground truth is a binarized image in which a pixel value of a region corresponding to a road in the learning image is 1 and a pixel value of a region other than the region corresponding to a road is 0 and the final segmentation map is a binarized image in which a pixel value of a region inferred to correspond to the road by the inference model in the prediction target image is 1 and a pixel value of a region other than the inferred region is 0.

6. The road detecting method according to claim 5, further comprising:
   determining a size of the structuring element based on a precision, a recall, and an intersection over union (IoU) calculated based on the ground truth for the final segmentation map.

7. The road detecting method according to claim 1, wherein the inference model is a U-Net-based convolutional neural network.

8. A convolutional neural network-based road detecting apparatus, comprising:
   a dilation operation unit which applies a dilation operation to a ground truth for a road image of a learning image;
   a learning unit which trains an inference model which detects a road region from a satellite image based on the learning image and the ground truth to which the dilation operation is applied;
   a prediction unit which receives a prediction target image and generates an original segmentation map in which a road region is detected from the prediction target image by means of the inference model; and
   an erosion operation unit which generates a final segmentation map by applying an erosion operation to the original segmentation map.

9. The road detecting apparatus according to claim 8, wherein the dilation operation unit performs a predetermined structuring element-based convolution operation on the ground truth.

10. The road detecting apparatus according to claim 9, wherein the erosion operation unit performs the predetermined structuring element-based convolution operation on the original segmentation map.

11. The road detecting apparatus according to claim 10, further comprising:
    a correction unit which determines a size of the structuring element based on a precision, a recall, and an intersection over union (IoU) calculated based on the ground truth for the final segmentation map.

12. The road detecting apparatus according to claim 8, wherein the inference model is a U-Net-based convolutional neural network.

\* \* \* \* \*